(12) United States Patent
Brahler, II

(10) Patent No.: US 7,017,642 B2
(45) Date of Patent: Mar. 28, 2006

(54) INFLATING DEVICE FOR TIRES

(76) Inventor: Richard W. Brahler, II, 2255 W. Morton Ave., Jacksonville, IL (US) 62650

( * ) Notice: Subject to any disclaimer, the term of this patent is extended or adjusted under 35 U.S.C. 154(b) by 0 days.

(21) Appl. No.: 11/135,844

(22) Filed: May 23, 2005

(65) Prior Publication Data

US 2005/0252612 A1 Nov. 17, 2005

Related U.S. Application Data

(63) Continuation-in-part of application No. 10/701,093, filed on Nov. 4, 2003.

(60) Provisional application No. 60/423,493, filed on Nov. 4, 2002.

(51) Int. Cl.
*B60C 25/132* (2006.01)
(52) U.S. Cl. .................................................. 157/1.17
(58) Field of Classification Search .................... 157/1, 157/1.1, 1.11, 1.17, 1.2, 1.22; 222/3, 631; 141/38
See application file for complete search history.

(56) References Cited

U.S. PATENT DOCUMENTS

| 3,866,654 | A | | 2/1975 | Duquesne |
| 3,937,264 | A | * | 2/1976 | Mikovits et al. .............. 157/1.1 |
| 5,042,547 | A | * | 8/1991 | Van De Sype ................ 157/1.1 |
| 5,056,576 | A | * | 10/1991 | Iori ............................ 157/1.17 |
| 5,072,764 | A | | 12/1991 | Ochoa |
| 5,456,302 | A | | 10/1995 | Demers |
| 5,570,733 | A | | 11/1996 | Desparois et al. |
| 5,878,801 | A | | 3/1999 | Ellis |
| 5,884,659 | A | | 3/1999 | Prosser et al. |
| 6,029,716 | A | * | 2/2000 | Hawk ........................... 141/38 |
| 6,076,586 | A | * | 6/2000 | Hans ........................... 157/1.17 |
| 6,179,033 | B1 | | 1/2001 | Demers |

* cited by examiner

*Primary Examiner*—Jacob K. Ackun, Jr.
(74) *Attorney, Agent, or Firm*—Mark E. Wiemelt

(57) ABSTRACT

A portable device for seating the beads of a tubeless tire and rim assembly, the device including an air tank containing pressurized air, the air tank being mounted substantially within a bracket, the bracket having a surface for supportably receiving the tire and rim assembly, a means for directing the pressurized air between a bead of the tire and the rim, and a positioning member which selectively stores the means for directing the pressurized air between a bead of the tire and the rim during seating.

76 Claims, 12 Drawing Sheets

INFLATING DEVICE FOR TIRES

PRIORITY

This is a continuation-in-part of application Ser. No. 10/701,093 filed Nov. 4, 2003 claiming priority of provisional patent application Ser. No. 60/423,493 filed Nov. 4, 2002.

BACKGROUND OF THE INVENTION

1. Field of the Invention

The present invention relates to the field of seating the beads of a tubeless tire to a rim.

2. The Prior Art

The present invention relates to an improved apparatus for creating an airtight seal between the beads of a tubeless tire and a rim. The present invention is directed to an apparatus that generates a pneumatic pulse and directs the pulse in a manner to impart momentum to a bead and inject air into the tire, thereby setting a bead of a tubeless tire to a rim.

As shown in the prior art, one of the difficulties presented in changing tubeless tires is establishing the initial airtight seal between the beads of the tire and the bead-seating surfaces of the rim on which it is to be mounted. An uninflated tire has an open space or gap between the bead and the bead-seating surface of the rim, which is often so large that air seeps through the gap during inflation. This large gap inhibits the tire's ability to hold air, thereby preventing it from expanding so as to reduce the size of the gap. Heavy truck tires especially encounter this problem because the stiffness of the tires prevents sufficient reduction of the gap for seating to occur.

A number of different tools have been used to attempt to seat the beads of a tubeless tire. For example, mechanical straps or hoops have been used which squeeze the tire along the circumference of its tread and thereby force a bead upward toward the bead-seating surface as shown in U.S. Pat. No. 3,578,059, issued to J. Uhen on May 11, 1971. Additionally, pneumatic tools have been used that inject a narrow jet or on a circular curtain of high pressure air between a bead and the bead-seating surface as shown in U.S. Pat. No. 3,866,654, issued to V. Duquesne on Feb. 18, 1975.

Another type of pneumatic tool that has been used is shown in U.S. Pat. No. 5,072,764, which uses a single high energy pulse of air to produce a bead motion and internal pressure wave that cooperate to cause the contact between the bead and the rim to progress dynamically from one end of the bead to the other. However, this device fails to recognize that its discharge nozzle restricts airflow and the valve used to discharge the air flow reduces the effectiveness of the apparatus because it retards the rise time of the pulse of air. Additionally, the device recognizes the importance of stabilizing the rim prior to actuation of the device. However, this apparatus contemplates use of a rim support block, which is independent of the device and therefore must be hauled along with the device.

Another pneumatic tool is the one disclosed in U.S. Pat. No. 5,456,302 which makes use of a piston that is releasably sealed against an outlet of an air tank. Although this device provides for increased pressure rise time, it is susceptible to small air leaks, has an appreciable kickback, is expensive to manufacture, and does not contemplate supporting the rim on the tire prior to actuating the device.

Yet another pneumatic tool is described in U.S. Pat. No. 6,179,033 which makes use of a quick fill/release port to discharge the pressurized air. However, the quick fill/release port is susceptible to leakage and will discharge the air tank completely within an hour or so. This makes the device unsuitable for use over an extended period of time. For example, tow truck operators that have to travel an extended amount of time or a trucker who wishes to travel with the device over an extended haul will find this device unsuitable for use. Additionally, this device does not contemplate supporting the rim on the tire prior to actuating the device.

SUMMARY OF THE INVENTION

A broad aspect of the invention includes an apparatus for creating an airtight seal between a bead of a tubeless tire and a rim. The device comprises an air tank containing pressurized air, a bracket connected to the air tank, the bracket having a surface for receiving the tire and rim, and a means for directing the pressurized air between the tubeless tire and rim.

This invention contemplates the use of a straight pass through valve that will instantaneously discharge the air at a high rate once activated. The preferred embodiment is designed to assist in the inflation of tubeless tires. The preferred embodiment incorporates large air tank capacity filled to a desired pressure. Preferably, a tire and rim assembly is leaned against the built-in bracket. By doing so, the weight of the tire automatically substantially sets a first bead of the tire on the rim. An air line can then be attached to the valve stem of the tire and the barrel is aimed between the second bead of the tire and rim while holding the barrel with both hands. In the preferred embodiment, unlike the prior art, instead of using a manual release valve, a foot pedal located on the lower part of the bracket can be actuated to allow an instantaneous blast of air to set the second bead. Because the valve releases the air much faster and from a large volume, less air pressure is necessary in the tank and is therefore more efficient than the prior art. Further, the need for a rim support block as is known in the art is eliminated.

In an alternative embodiment, a positioning member is provided to releasably retain the means for directing the pressurized air between the tubeless tire and rim for convenient storage. The positioning member also facilitates selective positioning of the means for directing the pressurized air between the tubeless tire and rim during seating. In operation, the positioning member reduces kickback of the means for directing the pressurized air between the tubeless tire and rim during seating. The positioning member also allows the operator to use one or possibly no hands on the means for directing the pressurized air between the tubeless tire and rim during seating.

In this respect, before explaining the preferred embodiment and the alternative embodiments of the present invention in detail, it is to be understood that the present invention is not limited in its application to the details of construction and to the arrangements of the components set forth in the following description or illustrated in the drawings. The present invention is capable of other embodiments and of being practiced and carried out in various ways. Also, it is to be understood that the phraseology and terminology employed herein are for the purpose of description and should not be regarded as limiting.

It is, therefore, an object of the present invention to discharge the air at a high rate so as to seat a bead of a tubeless tire onto a rim.

It is another object of the present invention to provide a bracket that the truck tire and rim can be rested on to seat a first bead of the tire onto the rim.

It is another object of the present invention to provide a bracket that will protect the air tank and valves from abuse and damage.

It is another object of the present invention to release pressurized air substantially all at once.

It is yet another object of the present invention to provide a foot actuated pedal to trigger the release valve, thereby allowing the operator to use both hands for other purposes.

It is yet another object of the present invention to create a safe working environment by placing the foot actuated pedal within the confines of the bracket.

It is still another object of the present invention to create a safe working environment by preventing heavy lifting of the air tank.

It is still another object of the present invention to contain all necessary parts for seating the beads of a tire in one mobile assembly.

It is another object of the invention to eliminate the need for a rim support block as is known in the art.

It is another object of the present invention to provide a positioning member to releasably retain the means for directing the pressurized air between the tubeless tire and rim for convenient storage.

It is still another object of the present invention to provide a positioning member which facilitates selective positioning of the means for directing the pressurized air between the tubeless tire and rim during seating.

It is yet another object of the present invention to provide a positioning member which reduces kickback of the means for directing the pressurized air between the tubeless tire and rim during seating.

It is another object of the present invention to provide a positioning member which allows the operator to use one or possibly no hands on the means for directing the pressurized air between the tubeless tire and rim during seating.

These and other objects of the present invention will become apparent in view of the present specification, claims and drawings.

There has thus been outlined, rather broadly, the more important features of the invention in order that the detailed description thereof that follows may be better understood, and in order that the present contribution to the art may be better appreciated. There are, of course, additional features of the invention that will be described hereinafter and that will form the subject matter of the invention.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the present invention in any way.

These together with other objects of the present invention, along with the various features of novelty which characterize the present invention, are pointed out with particularity in the claims annexed to and forming a part of this disclosure. For a better understanding of the present invention, its operating advantages and the specific objects attained by its uses, reference should be had to the accompanying drawings and descriptive matter in which there is illustrated a preferred embodiment of the present invention and alternative embodiments.

DRAWINGS

FIG. 1 is an elevated view of the device 10 in association with a tire 11 and rim 15.

Figure 4:
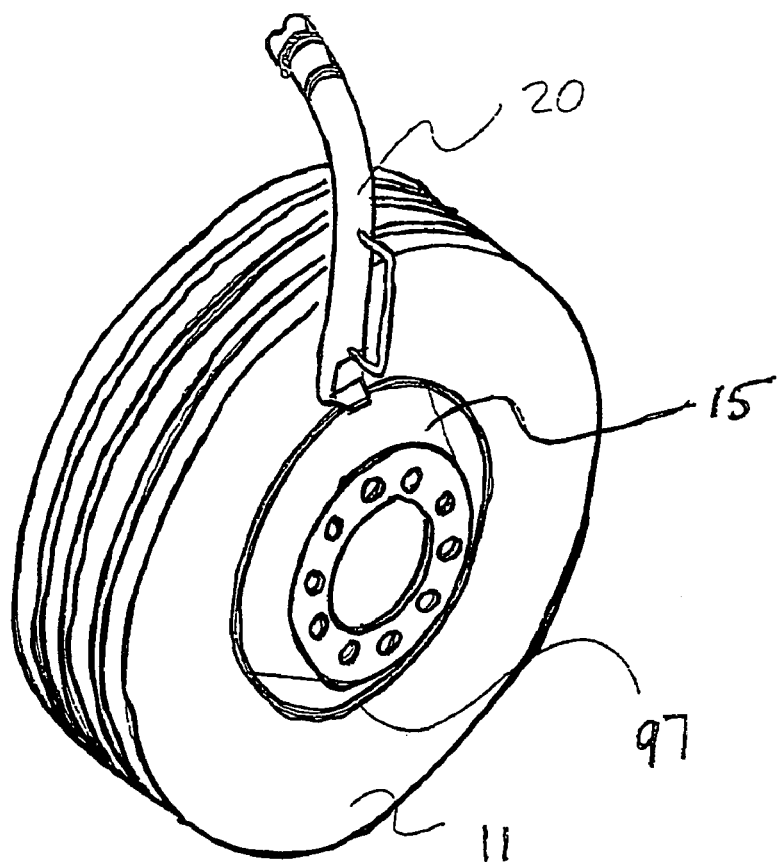

FIG. 4 is a view of the barrel 20 position relative to the rim 15 and tire 11.

Figure 5:
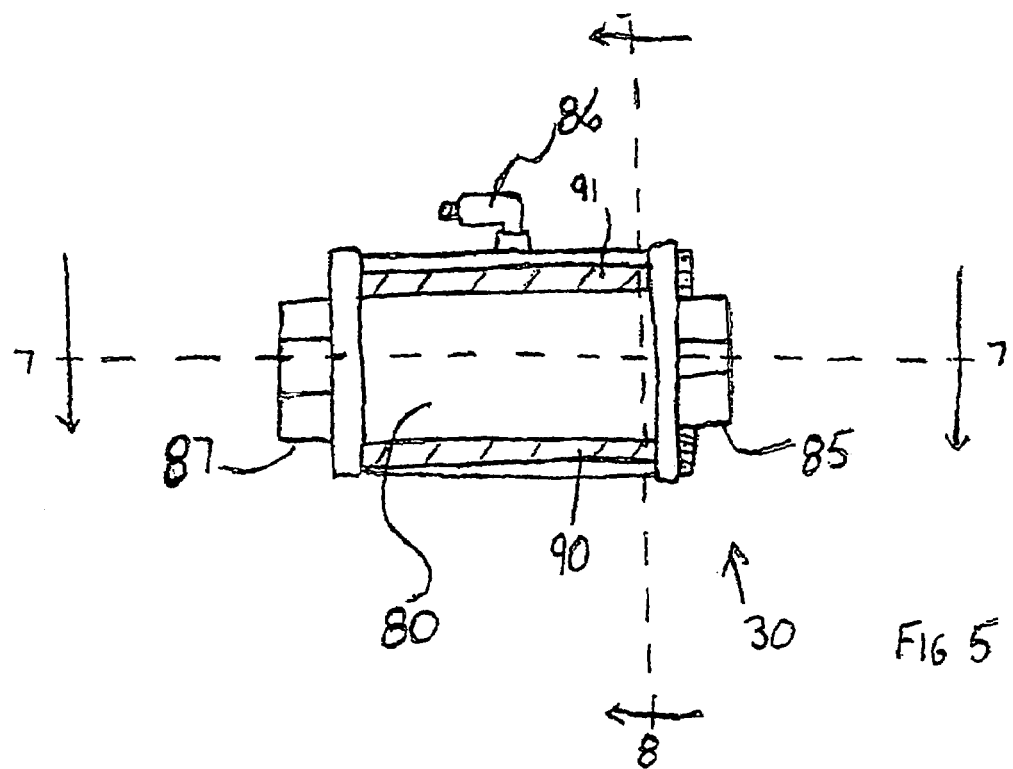

FIG. 5 is a side view of the exhaust valve 30.

Figure 6:
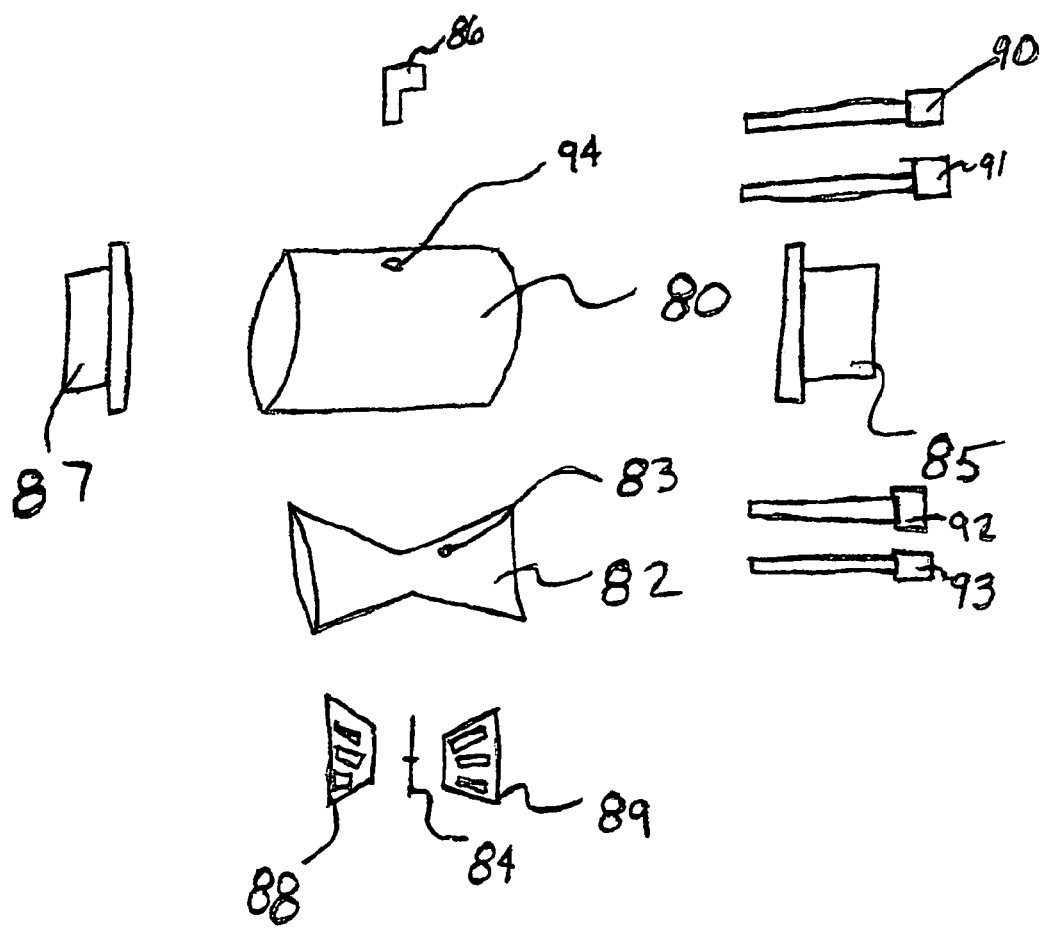

FIG. 6 is an exploded view of the exhaust valve 30.

Figure 7:
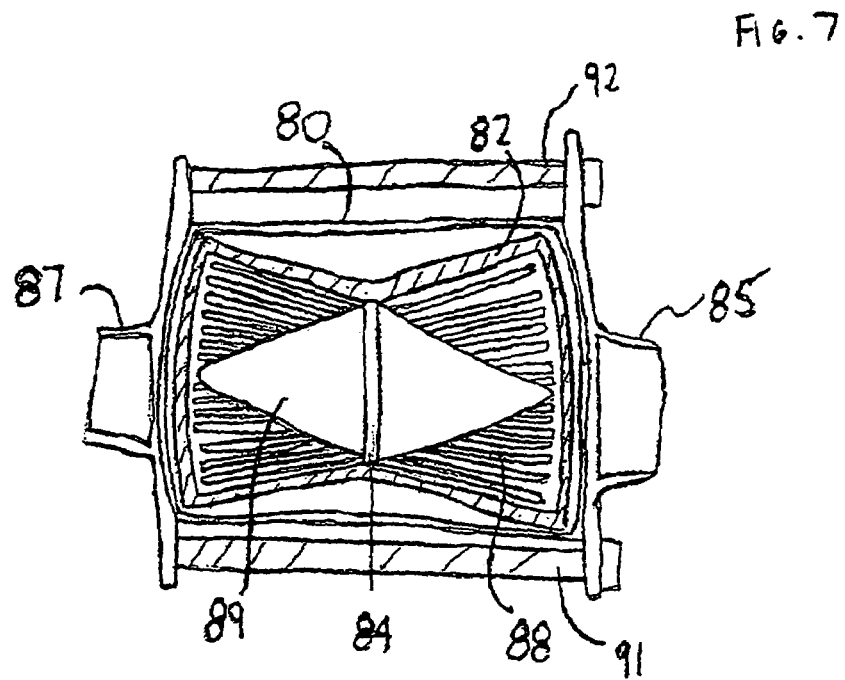

FIG. 7 is a view along line 7—7 in FIG. 6 of the exhaust valve 30.

Figure 8:
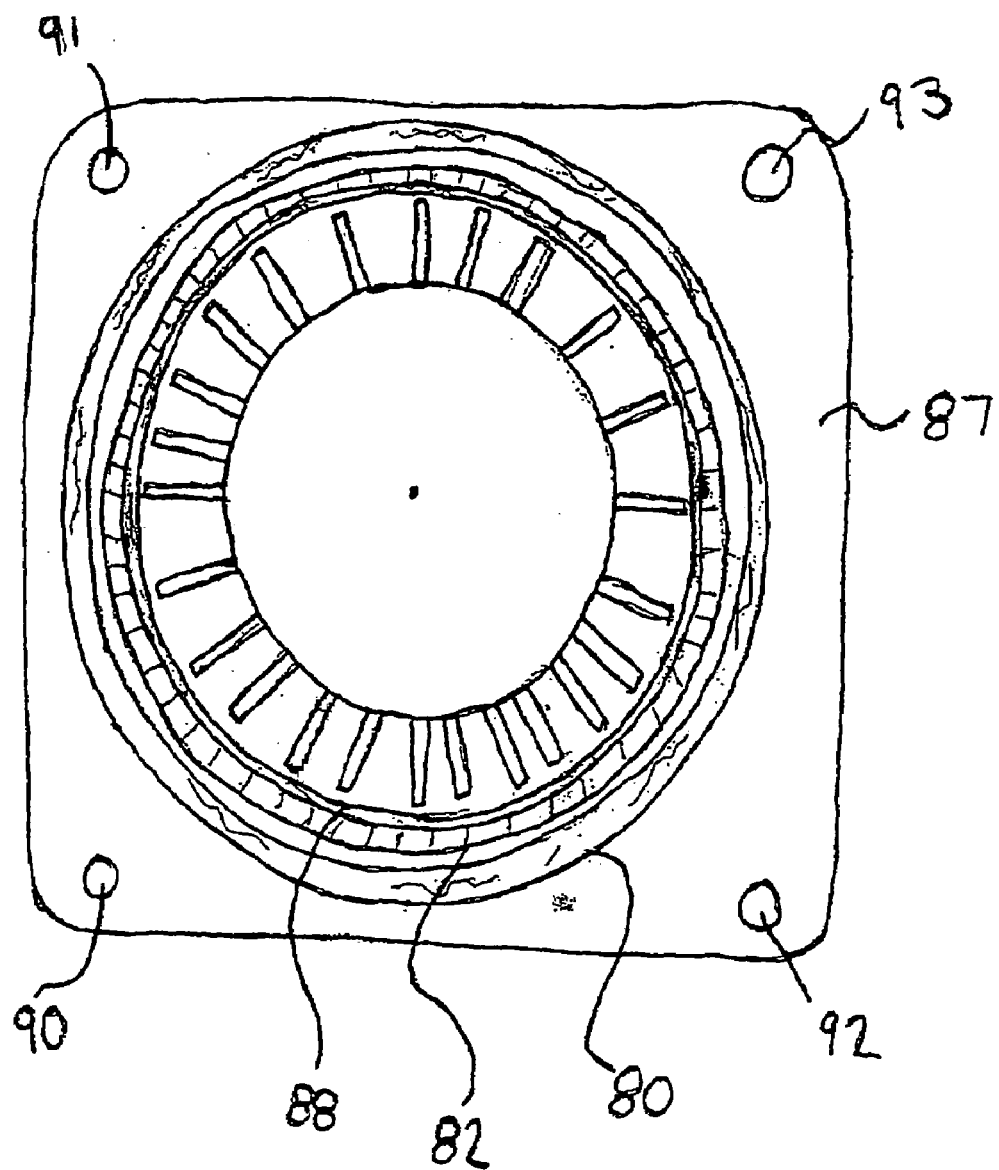

FIG. 8 is a view along line 8—8 in FIG. 6 of the exhaust valve 30 of the device 10.

Figure 9:
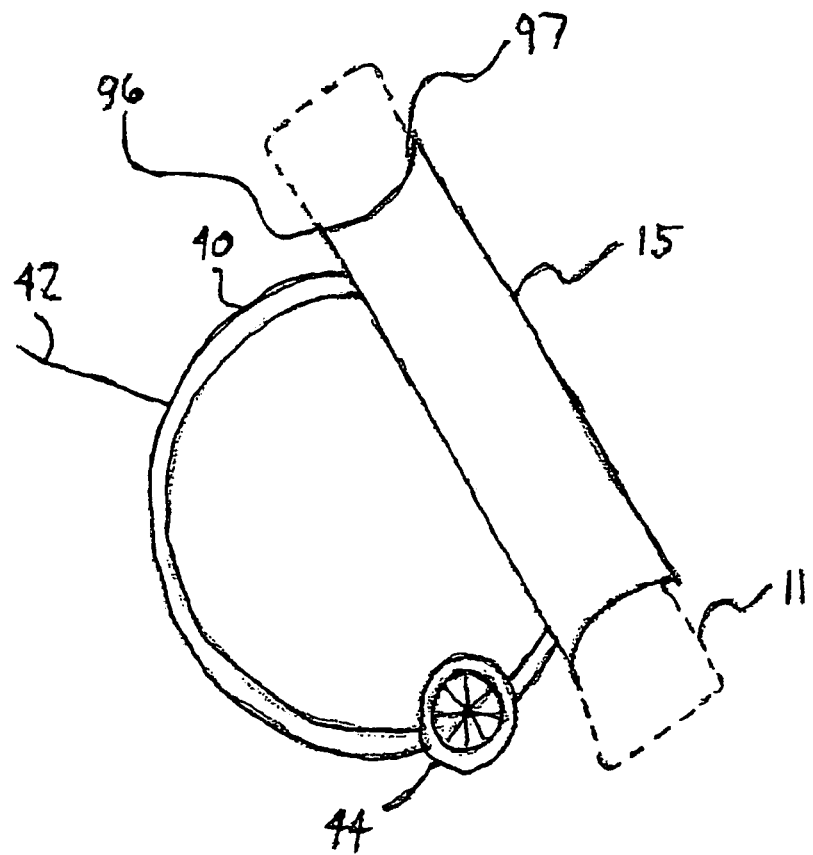

FIG. 9 is a side view of bracket 40 showing the engagement of the rim 15 when the rim 15 is rested thereupon.

Figure 10:
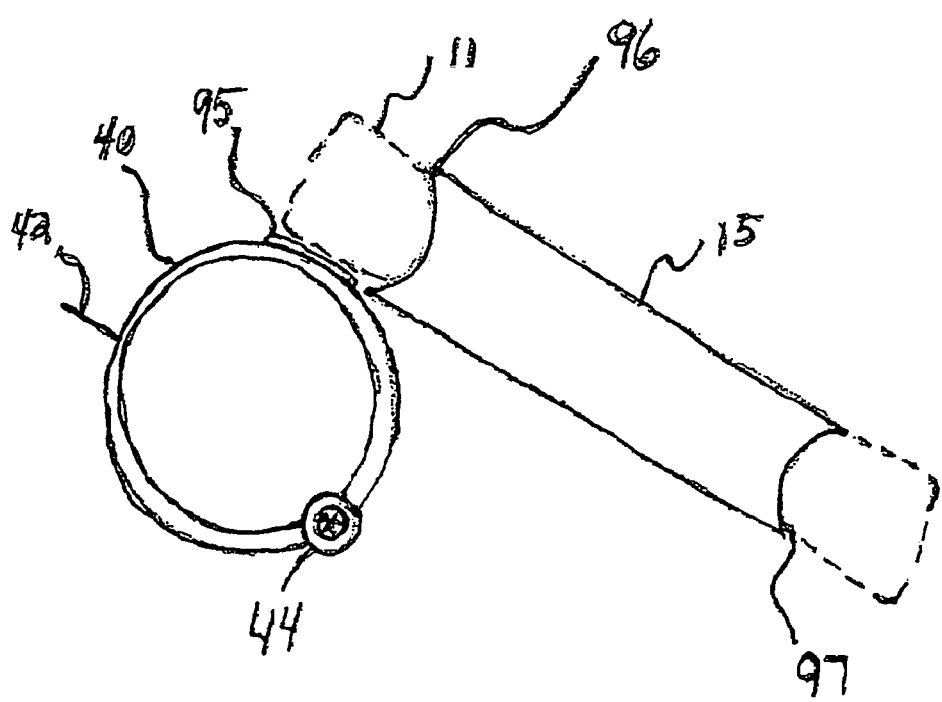

FIG. 10 is a side view of bracket 40 of an alternative embodiment of the invention showing the engagement of the tire 11 when the tire 11 is rested thereupon.

Figure 11:
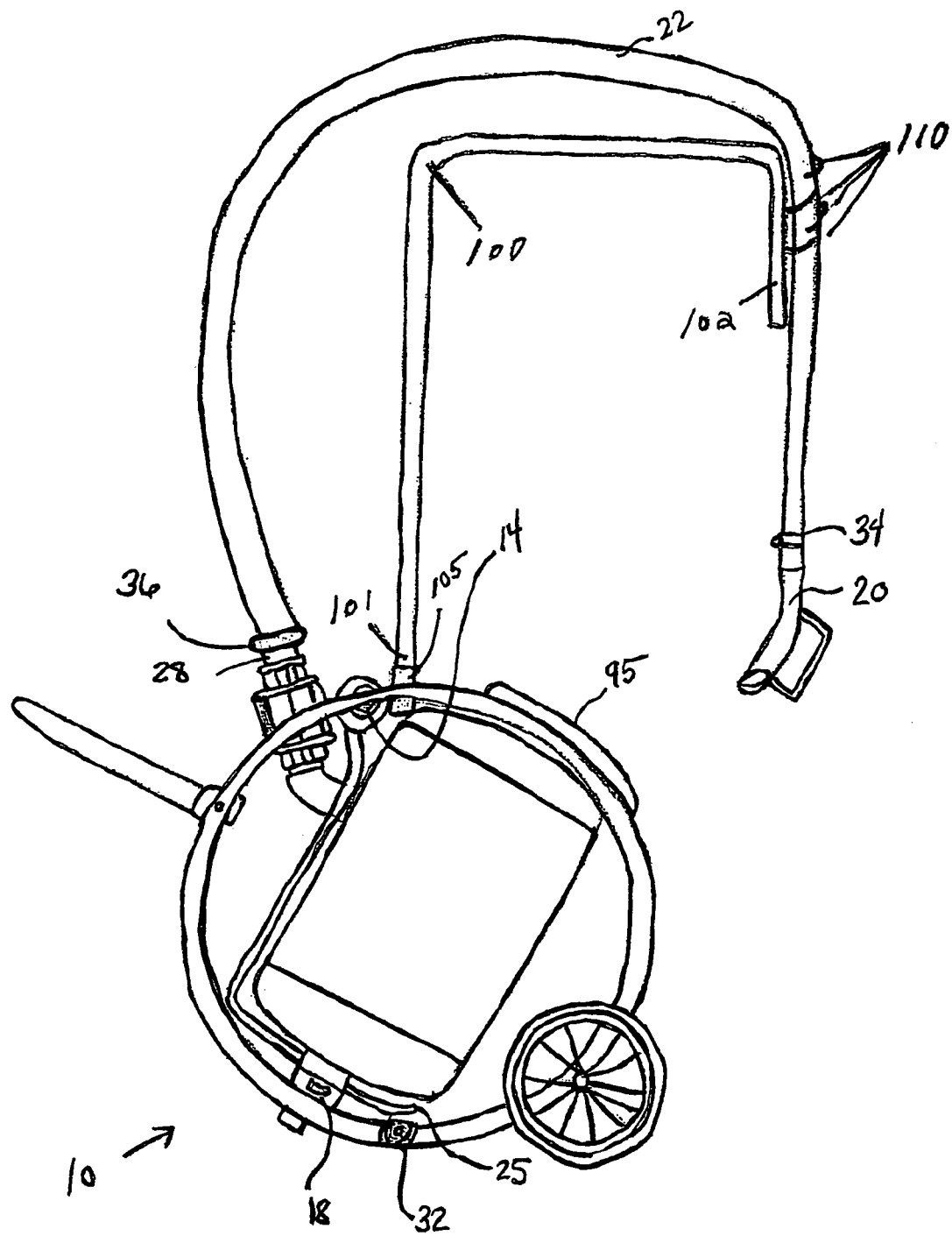

FIG. 11 is a side view of another alternative embodiment of invention showing the device 10 and the positioning member 100.

Figure 12:
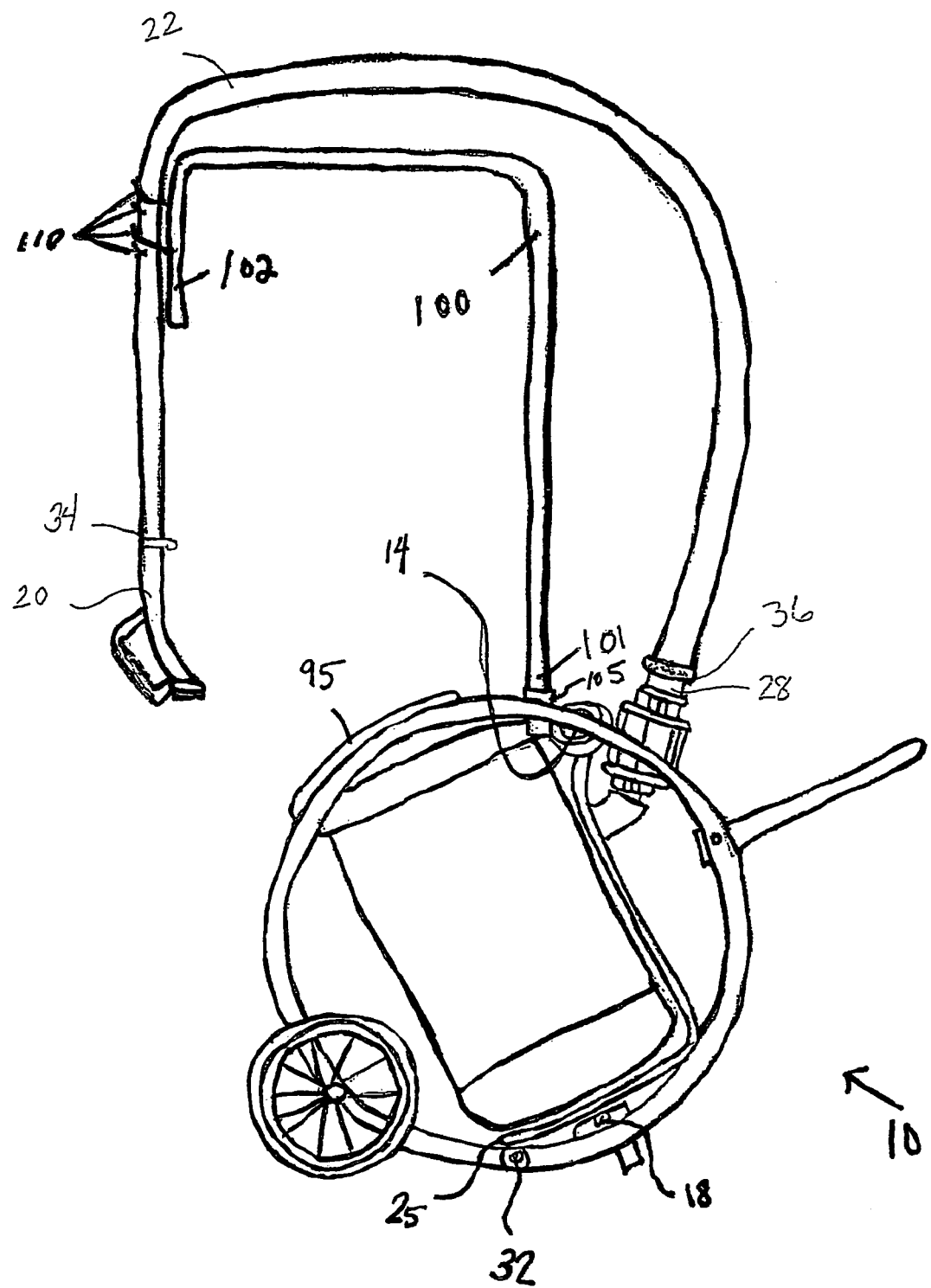

FIG. 12 is a side view of another alternative embodiment of invention showing the device 10 and the positioning member 100 rotated for storage.

Figure 13:
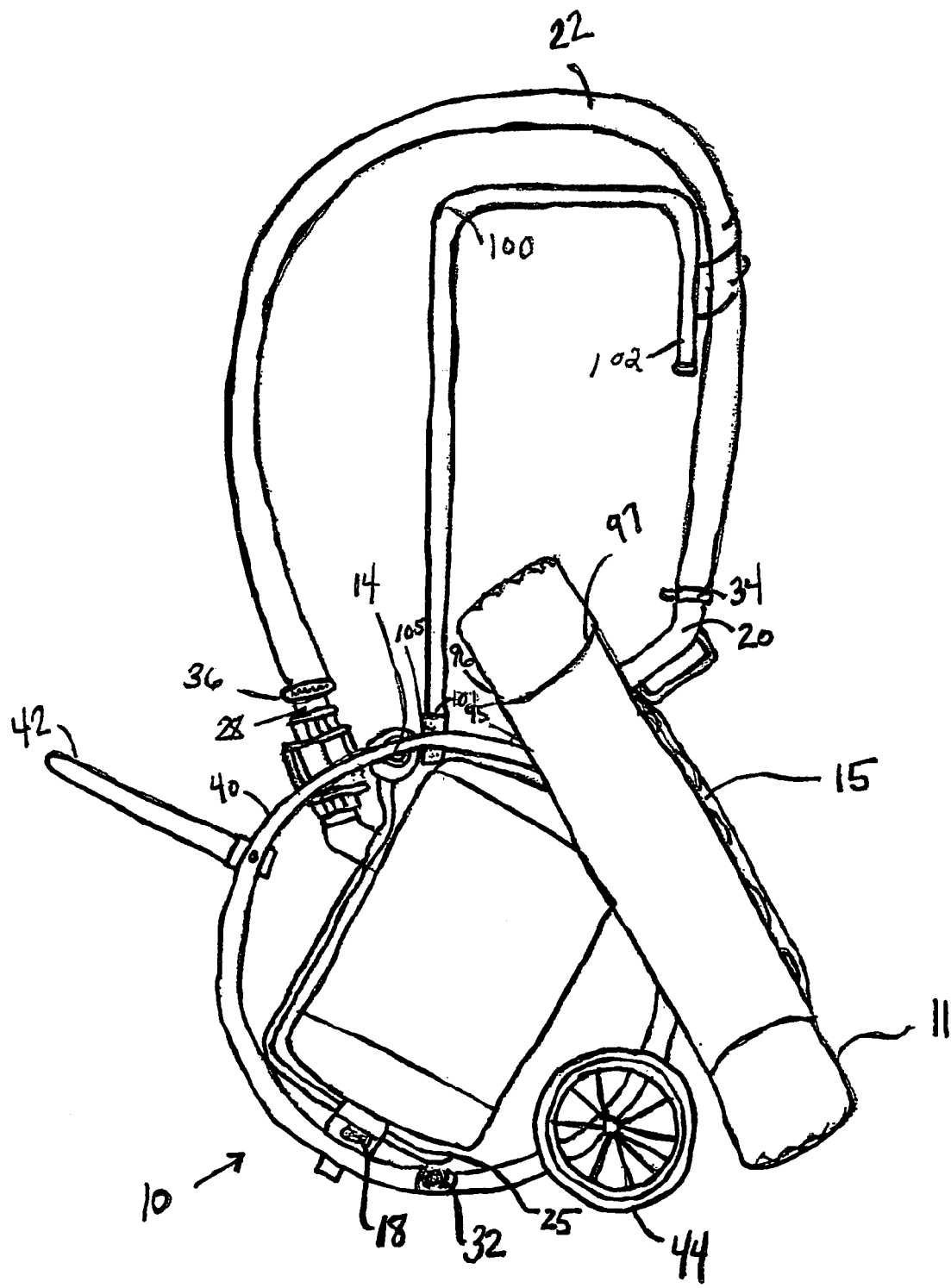

FIG. 13 is a side view of another alternative embodiment of invention showing the device 10, the positioning member 100 and the engagement of the tire 11 with the positioning member 100 and the device 10.

DETAILED DESCRIPTION OF THE PREFERRED EMBODIMENT

While the invention may be susceptible to embodiments in different forms, there will be described in detail the preferred embodiment and alternative embodiments with the understanding that the present disclosure is to be considered an exemplification of the principles of the invention, and is not intended to limit the claims to that which is described herein.

Figure 1:
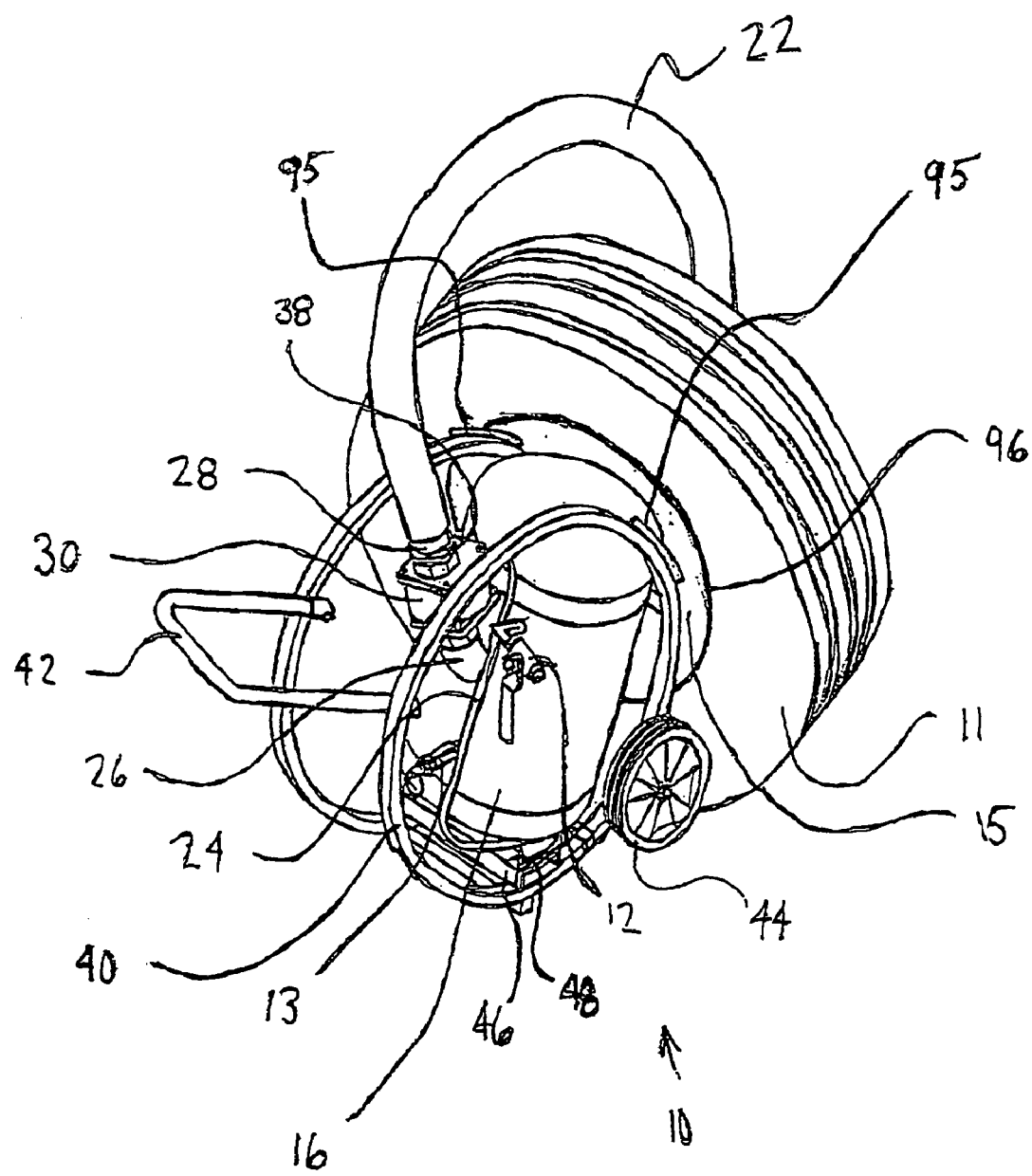

FIG. 1 is an elevated view of the device 10 of the preferred embodiment in association with a tire 11 and rim 15. The device 10 has an air tank 16, which is preferably an eight gallon tank. In the preferred embodiment, the air tank 16 is ASME® and CE® approved. The air tank 16 has affixed an intank valve 12, which is preferably a ¼ inch ball valve. The intank valve 12 allows for pressurization of the air tank 16, preferably to 120 pounds per square inch (lbs./in$^2$). This preferred feature provides for a safer working environment because of the lower working pressures utilized, as compared to those devices known in the art. The air tank 16 also has a safety valve 13, which is preferably a ¼ inch automatic release valve. The safety valve 13 prevents overfilling and allows for maximum pressure control.

The air tank 16 also attaches to a nipple 26 that attaches to an exhaust valve 30, which as will be discussed later provides for the substantially instantaneous release of the pressurized air within air tank 16. The nipple 26 is preferably a passage approximately 1½ inches diameter and 11 inches long and is preferably formed to take a 45 degree shape along the passage. Affixed to the exhaust valve 30 is a nipple 28, preferably made of stainless steel and is preferably 2¼ inches in diameter and 1½ inches in length, which also connects to a hose 22. A fastener 38, preferably a 1½ inch diameter lock nut, secures the nipple 28 to the exhaust valve 30. The nipple 28 is preferably made of stainless steel and is preferably 1½ inch in length and 2½ inches diameter. Hose 22 is preferably a ⅝ inch diameter nylon hose and preferably is 50 inches in length. As will be shown the hose 22 acts as a passageway between the exhaust valve 30 and the tire 11. The exhaust valve 30 is also affixed to a hose 24, which is preferably a 4 to 6 millimeter nylon hose and is preferably 30 inches in length; Hose 24 as will be shown acts as a passageway between the exhaust valve 30 and release valve 32.

Figure 3:
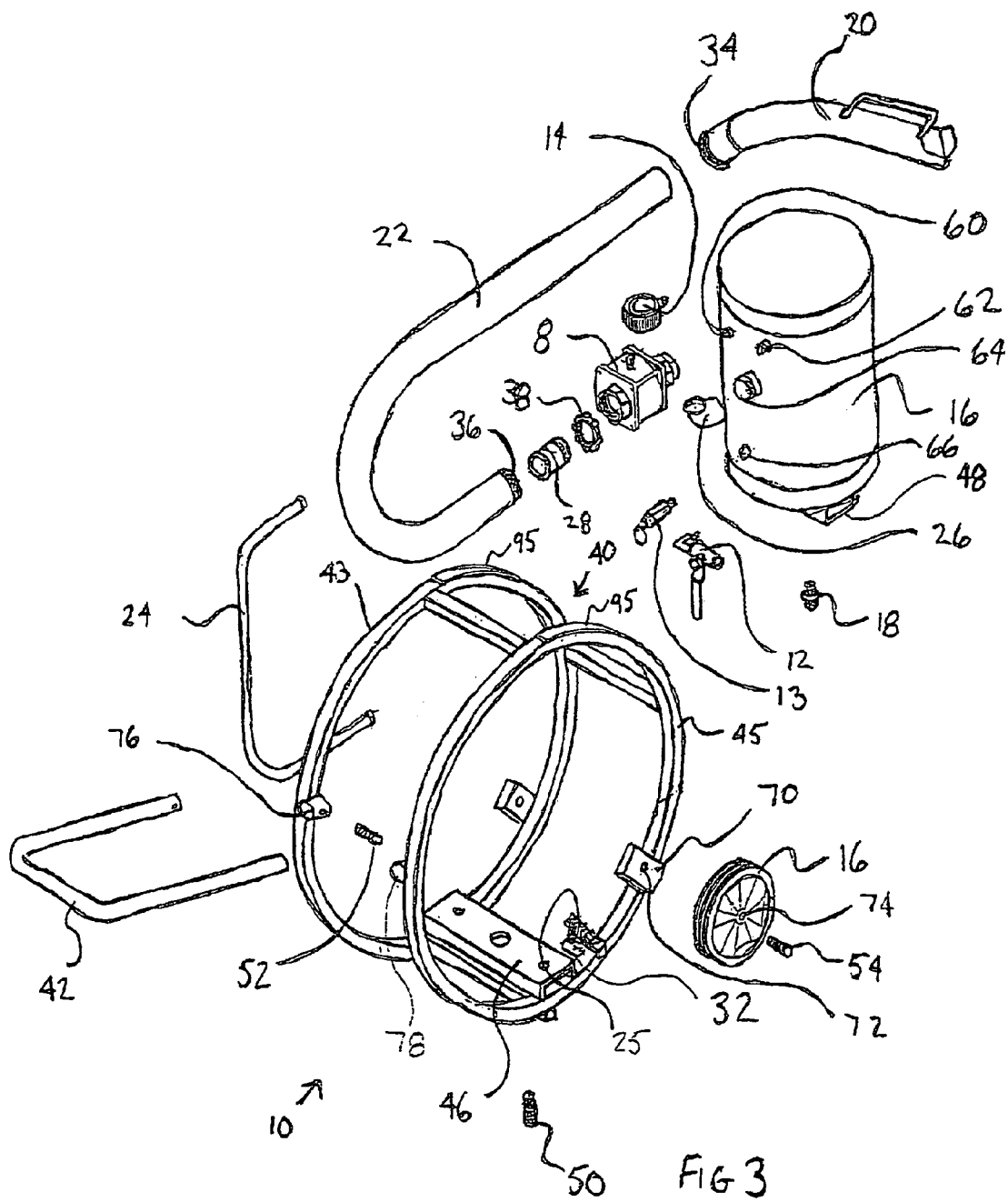
FIG. 3 is an elevated exploded view of the device 10.

As shown in FIG. 1, the device 10 of the preferred embodiment also has a bracket 40. The bracket 40 is preferably constructed of a pair of generally circular members 43, 45, which are preferably made of 1 inch square tubing. The members 43 and 45 are preferably spaced 250 millimeters apart and each have an outer diameter of approximately 610 millimeters. Although these are the preferred dimensions, any suitable dimensions can be utilized so that tire 11 and rim 15 assemblies of varied sizes will rest upon the bracket 40. As shown in FIG. 3, each member 43, 45 has a stripping 95, preferably made of rubber, and preferably affixed by adhesive. In operation, the bracket 40 of the preferred embodiment creates a surface that supports the rim 15 when rested on the bracket 40 and the weight of the tire 11 automatically substantially seats the first bead 96 of the tire 11 onto the rim 15 prior to seating of the second bead 97 of the tire 11 onto the rim 15. The stripping 95 protect the bracket 40 and the rim 15 from scratching and damage when the bracket 40 contacts the rim 15.

The bracket 40 is designed to support the tire 11 and rim 15, such that two points of the rim 15 contact and rest upon one point of each bracket member 43, 45. Thus, only the second bead 97 needs to be lifted to inflate. As shown in FIG. 9, in the preferred embodiment, the bracket 40 is shown engaging the rim 15 when the rim 15 is rested thereupon. The tire 11 is represented in hatched lines to better illustrate the engagement. Seating a first bead 96 prior to inflation allows the device 10 to work at a much lower air pressure making it safer and much more productive in inflating tires that are much stiffer and difficult to set.

The bracket 40 preferably has a bracket plate 46, which secures to the tank plate 48 of the air tank 16 by a fastener 50, as shown in FIG. 3, which is preferably a hexagon socket set screw, thereby affixing the tank 16 to the bracket 40. Thus the air tank 16 is mounted substantially within the bracket 40. Mounting the air tank 16 substantially with the bracket 40 also protects the air tank 16 and all its valves and gauges from the abuse and damage. The bracket 40 has a handle 42 and wheels 44, which allow for easy handling of the device 10. The wheels 44 are preferably nylon wheels. The device 10 is therefore self contained and has all parts in one mobile assembly needed to inflate truck tires. The wheels 44 make the unit perfect for in shop or even portable for use on a service truck. Additionally, the portability of the device 10 creates a safe working environment because heavy lifting is not required.

Figure 2:
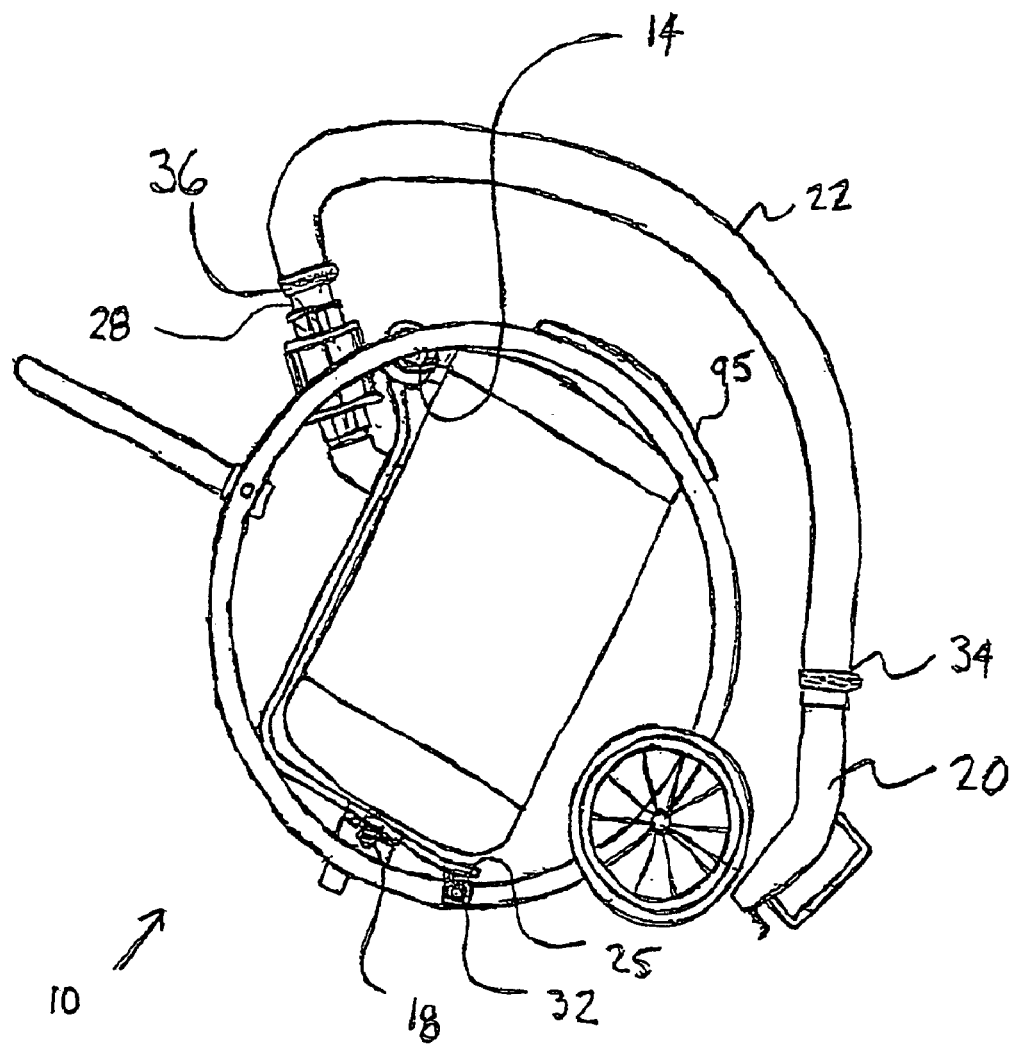
FIG. 2 is a side view of the device 10.

FIG. 2 is a side view of the preferred embodiment of the device 10. As shown in FIG. 2, the air tank 16 has a pressure gauge 14, which is preferably a ¼ inch connector. The air tank 16 also has a water release valve 18, which is preferably a ¼ inch connector. As shown in FIG. 2, a fastener 36, which is preferably a clamp, secures the hose 22 onto the nipple 28. Also shown in FIG. 2 is fastener 34, which also preferably is a clamp, and which secures the barrel 20 onto the hose 22.

As shown in FIG. 2, the hose 22 connects to a barrel 20. The barrel 20 is preferably formed to take a 45 degree shape and is made of 2 inch steel tubing. Additionally shown in FIG. 2 is the release valve 32. The release valve 32 is preferably a ¼ inch connector. As will be shown, opening the release valve 32 actuates the exhaust valve 30. This action causes the exhaust valve 30 to release pressurized air from the air tank 16, through the exhaust valve 30, through hose 22, through the barrel 20, and finally into the tire 11, thus seating the second bead 97 of the tire 11 onto the rim 15. The exhaust valve 30 allows for the immediate release of air and is much more accurate than other valves used in the prior art. The exhaust valve 30 is, as will be shown, preferably a straight pass through valve so there is nothing that inhibits the flow. Therefore the discharge is smoother and safer than others and therefore much more efficient.

FIG. 3 is an elevated exploded view of the device 10 of the preferred embodiment. As shown in FIG. 3 is the pedal 25. Pedal 25 is preferably a foot actuated trigger that opens the release valve 32 when pressed. The pedal 25 is preferably formed to secure to the bracket 40. The pedal 25 allows the user to concentrate two hands on the barrel 20 and hose 22 and position himself behind the tire 11 and rim 15 to keep his body and face away from the discharge. The pedal 25 is also mounted substantially within the bracket 40 so that actuation must be a deliberate act, thereby creating a much safer work environment.

The bracket 40 also has a first handle receptive member 76 and second handle receptive member 78 that allow for the handle 42 to affix to the bracket. Fastener 52, preferably ⁵⁄₁₆ inch in diameter and ⅝ inch in length hexagon socket set screw, affixes the handle 42 to the bracket 40. As shown in FIG. 3, the bracket 40 has a wheel plate 70 and wheel plate orifice 72. A fastener 54, which is preferably a ½ inch diameter and 1 inch in length hexagon socket set screw, affixes through the wheel orifice 74 and wheel plate orifice 72, thus affixing the wheel 44 to the bracket 40. This arrangement permits device 10 to be easily moved.

The air tank 16 preferably has an intank valve orifice 62 that allows for the intank valve 12 to attach to the air tank 16. The air tank 16 preferably has a safety valve orifice 66 that allows for the safety valve 13 to attach to the air tank 16. The air tank 16 preferably has a pressure gauge orifice 60 that allows for the pressure gauge 14 to attach to the air tank 16. The air tank 16 preferably has a water release valve orifice (not shown) that allows for the water release valve 18 to attach to the air tank 16. The air tank 16 preferably has an exhaust valve orifice 64 that allows for the exhaust valve 30 to attach to the air tank 16.

FIG. 4 is a view of the barrel 20 of the preferred embodiment positioned relative to the rim 15 and tire 11. As shown, the tire 11 and rim 15 can be rested on the bracket 40 of the device 10. Leaning the tire 11 and rim 15 against the bracket 40 allows the first bead 96 of the tire 11 to be automatically set against the rim 15. The barrel 20 can then be easily positioned relative to the rim 15 and second bead 97 prior to actuation of the device 10. An air line can then be attached to the valve stem of the wheel and the barrel 20 is aimed between the second bead 97 and tire 11 while holding the barrel 20 with both hands. In the preferred embodiment, as shown above, a pedal 25 located on the lower part of the bracket 40 can be actuated to allow an instantaneous blast of air to set the second bead 97. Because the exhaust valve 30 releases the air much faster and from a large volume, less air pressure is necessary in the tank and is therefore more efficient than the prior art.

FIG. 5 is a side view of the exhaust valve 30. The exhaust valve 30 is preferably a straight pass through valve. Therefore the discharge of air is smoother and safer than other valves as known in the prior art and is therefore much more instantaneous and efficient. As shown, the exhaust valve 30 has a housing 80 situated between an intank port 85 and exhaust port 87. The housing 80, intank port 85 and exhaust port 87 each have an orifice that align with each other creating a conduit between the air tank 16 and hose 22. First fastener 90, second fastener 91, third fastener 92, and fourth fastener 93 secure the housing 80 between the intank port 85 and exhaust port 87. The housing 80, intank port 85 and exhaust port 87 are preferably made of copper. The fasteners 90, 91, 92, and 93 are preferably ⅛ inch steel bolts. The housing 80 has a housing orifice 94, as shown in FIG. 6, that opens into the release port 86. The release port 86 is connected to the hose 24 and in turn the release valve 32.

FIG. 6 is an exploded view of the exhaust valve 30 of the preferred embodiment. As shown, the housing 80 contains therein a sleeve 82. The sleeve 82 is preferably made of rubber. The sleeve 82 has a sleeve orifice 83 that aligns with the housing orifice 94 as well as the release port 86.

The housing 80 also contains therein a stopper 84, a first nozzle 88, and a second nozzle 89. The stopper 84, first nozzle 88, and second nozzle 89 are preferably made of plastic. As shown, the first nozzle 88 and second nozzle 89 preferably contain a plurality of slits, as shown in FIGS. 7 and 8, which allow for passage of air therethrough. As shown, the nozzle 88 and nozzle 89 connect to the stopper 84, which is then placed within the sleeve 82. This combination of elements is then placed within the housing 80, making sure the sleeve orifice 83 and housing orifice 94 align, as shown in FIG. 6. The housing 80 and associated elements are then placed between the exhaust port 87 and intank port 85 and secured by the first fastener 90, second fastener 91, third fastener 92, and fourth fastener 93.

FIG. 8 is a view along line 8—8 in FIG. 6 of the exhaust valve 30 of the preferred embodiment of the device 10. As is shown, the intank nipple 88 has slits there through, which allow for passage of pressurized air. Additionally, as is shown by FIGS. 7 and 8, the nipple 88, as well as nipple 89, preferably have a smooth inner conical centerpiece that allows for equal distribution of airflow through the slits. This preferred arrangement of the exhaust valve 30 permits a straight pass through that substantially decreases any inhibition of the flow of air. As shown, the discharge is smoother and safer than other valves in the prior art and therefore much more instantaneous and efficient.

FIG. 7 is a view along line 7—7 in FIG. 6 of the exhaust valve 30 and illustrates the arrangement of elements within housing 80 of the preferred embodiment. As shown, the sleeve 82 surrounds the stopper 84, nozzle 88 and nozzle 89. Because of the elasticity of the sleeve 82, the sleeve 82 takes the shape of the stopper 84, nozzle 88 and nozzle 89 forming a space between the sleeve 82 and housing 80.

When the air tank 16 is charged with pressurized air and the release valve 32 is in a closed state, the exhaust valve 30 allows pressurized air to enter from the air tank 16 into the intank port 85. Pressurized air is allowed to pass through the slits of nozzle 88 and through the sleeve orifice 83 where the pressurized air enters the area between sleeve 82 and housing 80. Pressurized air also passes through the housing orifice (not shown) through the release port 86 through the hose 24 and finally into the closed release valve 32. For discussion purposes, this pressurized air shall be referred to as the air tank pressure. The air tank pressure is preferably preloaded at 120 lbs/in$^2$.

In contrast, the air pressure within barrel 20, hose 22, exhaust port 87 and second nozzle 89 are substantially equal to the external air pressure because of their exposure to the atmosphere, which is approximately 14.7 lbs/in$^2$ at sea level. For discussion purposes, this pressure shall be referred to as atmospheric pressure. Since the air tank pressure is higher than the atmospheric pressure, the air tank pressure causes the sleeve 82 to restrict around the nozzle 89 and stopper 84 creating a seal and closing the conduit within the exhaust valve 30.

However, once the release valve 32 is opened, the air pressure within the area between the sleeve 82 and housing 80 decreases substantially and approaches the atmospheric air pressure. As this happens, the air pressure within nozzle 88 is substantially greater than the pressure of the area between the sleeve 82 and housing 80. This causes the sleeve 82 to expand and take the shape of the housing 80. Thus an open conduit between the sleeve 82 and nozzles 88 and 89 is created, allowing pressurized air to enter from the air tank 16 through the intank port 85, through slits in nozzle 88, through the area between the nozzles 88 and 89 through the slits in nozzle 89 and finally through the exhaust port 87. This creates the instantaneous blast of air to set the second bead 97. The pressurized air is then directed through the hose 22 into the barrel 20. As shown, the barrel 20 is preferably fan shaped and directs the pressurized air into the tire 11 for an even bead seat.

FIG. 10 illustrates a bracket 40 of an alternative embodiment of the invention showing the engagement of the tire 11 when the tire 11 is rested thereupon. In operation, the bracket 40 of the preferred embodiment creates a surface that supports the tire 11 when rested on the bracket 40 and the weight of the rim 15 automatically substantially seats the first bead 96 of the tire 11 onto the rim 15 prior to seating of the second bead 97 of the tire 11 onto the rim 15. The stripping 95 protect the bracket 40 and tire 11 from scratching and damage when the bracket 40 contacts the tire 11.

The bracket 40 of the alterative embodiment is designed to support the tire 11 and rim 15, such that two points of the tire 11 contact and rest upon one point of each bracket member 43, 45. Thus, only the second bead 97 needs to be lifted to inflate. As shown in FIG. 10, in the preferred embodiment, the bracket 40 is shown engaging the tire 11 when the tire 11 is rested thereupon. Otherwise, it should be readily understood by those skilled in the art that the alternative embodiment operates the same as the preferred embodiment.

FIG. 11 is a side view of another alternative embodiment of the invention showing the device 10 and a positioning member 100. FIG. 12 is a side view of the other alternative embodiment of the invention showing the device 10 and the positioning member 100 rotated for storage. The positioning member 100 is preferably constructed of 1 inch round tubing which generally forms a J shape having a first positioning member end 101 and a second positioning member end 102. Retention members 110 are affixed to the positioning member 100 proximate the second positioning member end 102 by welding, adhesives, banding, bolts, screws or other suitable affixing means. The preferred retention members 110 are four generally semi-circular bendable tubes positioned to cooperatively receive therebetween and frictionally retain the hose 22 for selective storage of the hose 22 or engagement of the barrel 20 with the tire 11 and rim 15 assemblies, as shown in FIG. 13. The positioning member 100 is coupled to the bracket 40 of the device 10 by a coupling means 105 located proximate the first positioning member end 101. The coupling means 105 preferably allows for rotation, pivoting or translation of the positioning member 100. The preferred coupling means 105 is a generally cup-shaped member aligned substantially vertically and sized and adapted to receive the first positioning member end 101 therein in frictional and rotational supporting engagement. The coupling means 105 may be affixed to the positioning member 100 and bracket 40 by welding, adhesives, banding, bolts, screws or other suitable affixing means. Although these are the preferred dimensions, shapes, coupling means and retention members, it should readily be understood by those skilled in the art that any suitable dimensions, shape, coupling means and retention members can be utilized so that the hose 22 and barrel 20 being retained in the positioning member 100 are adapted to selectively store the hose 22 and barrel 20 or position the barrel 20 in cooperative engagement with the tire 11 and rim 15 assemblies of varied sizes while the tire 11 and rim 15 assemblies rest upon the bracket 40.

In operation, the positioning member 100 may be positioned to selectively store the hose 22 and barrel 20 or position the barrel 20 in cooperative engagement with the tire 11 and rim 15 assemblies during seating. Otherwise, it should be readily understood by those skilled in the art that this alternative embodiment operates the same as the preferred embodiment and other alternative embodiment.

In operation, the positioning member 100 reduces kickback of the hose 22 and barrel 20 and allows the operator to use one or possibly no hands on the hose 22 and barrel 20 during seating.

Hence, while the invention has been described in connection with a preferred embodiment and alternative embodiments, it will be understood that it is not intended that the invention be limited to those embodiments. On the contrary, it is intended to cover all alternatives, modifications and equivalents as may be included within the spirit and scope of the invention as disclosed.

As to the manner of usage and operation of the instant invention, same should be apparent from the above disclosure, and accordingly no further discussion relevant to the manner of usage and operation of the instant invention shall be provided.

With respect to the above description then, it is to be realized that the optimum proportions for the elements of the invention, and variations in size, materials, shape, form, function and manner of operation, assembly and use, are deemed readily apparent and obvious to one skilled in the art, and all equivalent relationships described in the specification are intended to be encompassed by the present invention.

Therefore, the foregoing is considered illustrative of only the principles of the invention. Further, since numerous modifications and changes will readily occur to those skilled in the art, it is not desired to limit the invention to the exact method, construction and operation shown and described, and accordingly, all suitable modifications and equivalents may be resorted to, falling within the scope of the invention.

I claim:

1. A portable device for seating the first bead and second bead of a tubeless tire and rim assembly, the device comprising:
   a. an air tank containing pressurized air;
   b. the air tank being mounted substantially within a bracket; the bracket having a surface for supportably receiving the tire and rim assembly;
   c. a means for directing the pressurized air between the second bead of the tire and the rim; and
   d. a positioning member coupled to the device and adapted to position the means for directing the pressurized air in cooperative engagement with the second bead of the tire and the rim to direct the pressurized air between the second bead of the tire and the rim.

2. The device of claim 1 wherein the surface for supportably receiving the tire and rim assembly automatically substantially seats the first bead of the tire and the rim.

3. The device of claim 2 wherein the means for directing the pressurized air between the second bead of the tire and the rim comprises an exhaust valve pneumatically connected to a pedal.

4. The device of claim 1 wherein the means for directing the pressurized air between the second bead of the tire and the rim comprises an exhaust valve pneumatically connected to a pedal.

5. The device of claim 4 wherein the surface for supportably receiving the tire and rim assembly automatically substantially seats the first bead of the tire and the rim.

6. The device of claim 3 wherein the exhaust valve comprises a housing, an intank port connecting the air tank to the housing, an exhaust port being connected to a barrel, a release port being connected to a release valve, the release valve being actuated by a pedal, the housing comprising a housing orifice, a sleeve, the sleeve having a sleeve orifice substantially aligned with the housing orifice and opening into the release port, the sleeve enveloping a stopper, the stopped connecting a first nozzle and a second nozzle, such that triggering of the pedal actuates the release valve, the release valve creating a pressure differential whereby the sleeve expands such that air within the air tank being capable of passing through the first nozzle and second nozzle through the exhaust port and into the barrel, whereby the barrel being positioned between the second bead of the tire and the rim directs pressurized air to seat the tire.

7. The device of claim 4 wherein the pedal is mounted substantially within the bracket.

8. The device of claim 1 wherein the positioning member is rotatably coupled to the bracket to selectively store the means for directing the pressurized air or to position the means for directing the pressurized air in cooperative engagement with the second bead of the tire and the rim to direct the pressurized air between the second bead of the tire and the rim during seating.

9. The device of claim 2 wherein the positioning member is rotatably coupled to the bracket to selectively store the means for directing the pressurized air or to position the means for directing the pressurized air in cooperative engagement with the second bead of the tire and the rim to direct the pressurized air between the second bead of the tire and the rim during seating.

10. The device of claim 3 wherein the positioning member is rotatably coupled to the bracket to selectively store the means for directing the pressurized air or to position the means for directing the pressurized air in cooperative engagement with the second bead of the tire and the rim to direct the pressurized air between the second bead of the tire and the rim during seating.

11. The device of claim 4 wherein the positioning member is rotatably coupled to the bracket to selectively store the means for directing the pressurized air or to position the means for directing the pressurized air in cooperative engagement with the second bead of the tire and the rim to direct the pressurized air between the second bead of the tire and the rim during seating.

12. The device of claim 5 wherein the positioning member is rotatably coupled to the bracket to selectively store the means for directing the pressurized air or to position the means for directing the pressurized air in cooperative engagement with the second bead of the tire and the rim to direct the pressurized air between the second bead of the tire and the rim during seating.

13. The device of claim 6 wherein the positioning member is rotatably coupled to the bracket to selectively store the means for directing the pressurized air or to position the means for directing the pressurized air in cooperative engagement with the second bead of the tire and the rim to direct the pressurized air between the second bead of the tire and the rim during seating.

14. The device of claim 7 wherein the positioning member is rotatably coupled to the bracket to selectively store the means for directing the pressurized air or to position the means for directing the pressurized air in cooperative engagement with the second bead of the tire and the rim to direct the pressurized air between the second bead of the tire and the rim during seating.

15. The device of claim 1 wherein:
 a. the positioning member comprises a first positioning member end and a second positioning member end;
 b. the positioning member comprises retention members affixed thereto proximate the second positioning member end to cooperatively receive and retain the means for directing the pressurized air; and
 c. the positioning member is coupled to the bracket of the device by a coupling means located proximate the first positioning member end.

16. The device of claim 2 wherein:
 a. the positioning member comprises a first positioning member end and a second positioning member end;
 b. the positioning member comprises retention members affixed thereto proximate the second positioning member end to cooperatively receive and retain the means for directing the pressurized air; and
 c. the positioning member is coupled to the bracket of the device by a coupling means located proximate the first positioning member end.

17. The device of claim 3 wherein:
 a. the positioning member comprises a first positioning member end and a second positioning member end;
 b. the positioning member comprises retention members affixed thereto proximate the second positioning member end to cooperatively receive and retain the means for directing the pressurized air; and
 c. the positioning member is coupled to the bracket of the device by a coupling means located proximate the first positioning member end.

18. The device of claim 4 wherein:
 a. the positioning member comprises a first positioning member end and a second positioning member end;
 b. the positioning member comprises retention members affixed thereto proximate the second positioning member end to cooperatively receive and retain the means for directing the pressurized air; and
 c. the positioning member is coupled to the bracket of the device by a coupling means located proximate the first positioning member end.

19. The device of claim 5 wherein:
 a. the positioning member comprises a first positioning member end and a second positioning member end;
 b. the positioning member comprises retention members affixed thereto proximate the second positioning member end to cooperatively receive and retain the means for directing the pressurized air; and
 c. the positioning member is coupled to the bracket of the device by a coupling means located proximate the first positioning member end.

20. The device of claim 6 wherein:
 a. the positioning member comprises a first positioning member end and a second positioning member end;
 b. the positioning member comprises retention members affixed thereto proximate the second positioning member end to cooperatively receive and retain the means for directing the pressurized air; and
 c. the positioning member is coupled to the bracket of the device by a coupling means located proximate the first positioning member end.

21. The device of claim 7 wherein:
 a. the positioning member comprises a first positioning member end and a second positioning member end;
 b. the positioning member comprises retention members affixed thereto proximate the second positioning member end to cooperatively receive and retain the means for directing the pressurized air; and
 c. the positioning member is coupled to the bracket of the device by a coupling means located proximate the first positioning member end.

22. The device of claim 8 wherein:
 a. the positioning member comprises a first positioning member end and a second positioning member end;
 b. the positioning member comprises retention members affixed thereto proximate the second positioning member end to cooperatively receive and retain the hose; and
 c. the positioning member is coupled to the bracket of the device by a coupling means located proximate the first positioning member end.

23. The device of claim 9 wherein:
 a. the positioning member comprises a first positioning member end and a second positioning member end;
 b. the positioning member comprises retention members affixed thereto proximate the second positioning member end to cooperatively receive and retain the hose; and
 c. the positioning member is coupled to the bracket of the device by a coupling means located proximate the first positioning member end.

24. The device of claim 10 wherein:
 a. the positioning member comprises a first positioning member end and a second positioning member end;
 b. the positioning member comprises retention members affixed thereto proximate the second positioning member end to cooperatively receive and retain the hose; and
 c. the positioning member is coupled to the bracket of the device by a coupling means located proximate the first positioning member end.

25. The device of claim 11 wherein:
 a. the positioning member comprises a first positioning member end and a second positioning member end;
 b. the positioning member comprises retention members affixed thereto proximate the second positioning member end to cooperatively receive and retain the hose; and
 c. the positioning member is coupled to the bracket of the device by a coupling means located proximate the first positioning member end.

26. The device of claim 12 wherein:
 a. the positioning member comprises a first positioning member end and a second positioning member end;
 b. the positioning member comprises retention members affixed thereto proximate the second positioning member end to cooperatively receive and retain the hose; and
 c. the positioning member is coupled to the bracket of the device by a coupling means located proximate the first positioning member end.

27. The device of claim 13 wherein:
 a. the positioning member comprises a first positioning member end and a second positioning member end;
 b. the positioning member comprises retention members affixed thereto proximate the second positioning member end to cooperatively receive and retain the hose; and
 c. the positioning member is coupled to the bracket of the device by a coupling means located proximate the first positioning member end.

28. The device of claim 14 wherein:
 a. the positioning member comprises a first positioning member end and a second positioning member end;
 b. the positioning member comprises retention members affixed thereto proximate the second positioning member end to cooperatively receive and retain the hose; and
 c. the positioning member is coupled to the bracket of the device by a coupling means located proximate the first positioning member end.

29. A portable device for seating the first bead and second bead of a tubeless tire and rim assembly, the device comprising:
 a. an air tank containing pressurized air;
 b. the air tank being mounted substantially within a bracket, the bracket having a surface for receiving the tire and rim assembly;
 c. an exhaust valve being connected to the air tank;
 d. a barrel being connected to the exhaust valve;
 e. a pedal being pneumatically connected to the exhaust valve, whereby triggering of the pedal actuates the exhaust valve causing the air tank to release pressurized air to the connected barrel; and
 f. a positioning member coupled to the device and adapted to position the barrel in cooperative engagement with the second bead of the tire and the rim to direct the pressurized air between the second bead of the tire and the rim.

30. The device of claim 29 wherein the pedal is mounted substantially within the bracket.

31. The device of claim 29 wherein the surface for supportably receiving the tire and rim assembly is receptive to allow a first bead of the tire and rim assembly to be automatically substantially set.

32. The device of claim 29 wherein the positioning member is rotatably coupled to the bracket to selectively store the barrel or to position the barrel in cooperative engagement with the second bead of the tire and the rim to direct the pressurized air between the second bead of the tire and the rim during seating.

33. The device of claim 30 wherein the positioning member is rotatably coupled to the bracket to selectively store the barrel or to position the barrel in cooperative engagement with the second bead of the tire and the rim to direct the pressurized air between the second bead of the tire and the rim during seating.

34. The device of claim 31 wherein the positioning member is rotatably coupled to the bracket to selectively store the barrel or to position the barrel in cooperative engagement with the second bead of the tire and the rim to direct the pressurized air between the second bead of the tire and the rim during seating.

35. The device of claim 29 further comprising:
 a. a hose, said hose secured in cooperative engagement between the exhaust valve and the barrel;
 b. the positioning member comprising a first positioning member end, a second positioning member end, and one or more retention members affixed to the positioning member proximate the second positioning member end to cooperatively receive and retain the hose; and
 c. the positioning member is coupled to the bracket of the device by a coupling means located proximate the first positioning member end.

36. The device of claim 30 further comprising:
 a. a hose, said hose secured in cooperative engagement between the exhaust valve and the barrel;
 b. the positioning member comprising a first positioning member end, a second positioning member end, and one or more retention members affixed to the positioning member proximate the second positioning member end to cooperatively receive and retain the hose; and
 c. the positioning member is coupled to the bracket of the device by a coupling means located proximate the first positioning member end.

37. The device of claim 31 further comprising:
 a. a hose, said hose secured in cooperative engagement between the exhaust valve and the barrel;
 b. the positioning member comprising a first positioning member end, a second positioning member end, and one or more retention members affixed to the positioning member proximate the second positioning member end to cooperatively receive and retain the hose; and
 c. the positioning member is coupled to the bracket of the device by a coupling means located proximate the first positioning member end.

38. The device of claim 32 wherein:
 a. the positioning member comprises a first positioning member end and a second positioning member end;
 b. the positioning member comprises retention members affixed thereto proximate the second positioning member end to cooperatively receive and retain the hose; and
 c. the positioning member is coupled to the bracket of the device by a coupling means located proximate the first positioning member end.

39. The device of claim 33 wherein:
 a. the positioning member comprises a first positioning member end and a second positioning member end;
 b. the positioning member comprises retention members affixed thereto proximate the second positioning member end to cooperatively receive and retain the hose; and
 c. the positioning member is coupled to the bracket of the device by a coupling means located proximate the first positioning member end.

40. The device of claim 34 wherein:
 a. the positioning member comprises a first positioning member end and a second positioning member end;
 b. the positioning member comprises retention members affixed thereto proximate the second positioning member end to cooperatively receive and retain the hose; and c. the positioning member is coupled to the bracket of the device by a coupling means located proximate the first positioning member end.

41. A portable device for seating the first bead and second bead of a tubeless tire and rim assembly, the device comprising:
   a. an air tank containing pressurized air;
   b. the air tank being mounted substantially within a bracket, the bracket having a surface for receiving the tire and rim assembly;
   c. an exhaust valve, wherein the exhaust valve comprises a housing, an intank port connecting the air tank to the housing, an exhaust port being connected to a barrel, a release port being connected to a release valve, the release valve being actuated by a pedal, the housing comprising a housing orifice, a sleeve, the sleeve having a sleeve orifice substantially aligned with the housing orifice and opening into the release port, the sleeve enveloping a stopper, the stopped connecting a first nozzle and a second nozzle, such that the triggering of the pedal actuates the release valve, the release valve creating a pressure differential whereby the sleeve expands such that air within the air tank being capable of passing through the first nozzle and second nozzle through the exhaust port and into the barrel; and
   d. a positioning member coupled to the device and adapted to position the barrel in cooperative engagement with the second bead of the tire and the rim to direct the pressurized air between the second bead of the tire and the rim.

42. The device of claim 41 wherein the positioning member is rotatably coupled to the bracket to selectively store the barrel or to position the barrel in cooperative engagement with the second bead of the tire and the rim to direct the pressurized air between the second bead of the tire and the rim during seating.

43. The device of claim 41 further comprising:
   a. a hose, said hose secured in cooperative engagement between the exhaust valve and the barrel;
   b. the positioning member comprising a first positioning member end, a second positioning member end, and one or more retention members affixed to the positioning member proximate the second positioning member end to cooperatively receive and retain the hose; and
   c. the positioning member is coupled to the bracket of the device by a coupling means located proximate the first positioning member end.

44. The device of claim 42 wherein:
   a. the positioning member comprises a first positioning member end and a second positioning member end;
   b. the positioning member comprises retention members affixed thereto proximate the second positioning member end to cooperatively receive and retain the hose; and
   c. the positioning member is coupled to the bracket of the device by a coupling means located proximate the first positioning member end.

45. A method for seating the first bead and second bead of a tubeless tire and rim assembly, including the steps of:
   a. accumulating at elevated pressure a charge of air;
   b. supporting the tire and rim assembly in a substantially upright position such that the weight of the tire automatically substantially seats the first bead of the tire and rim assembly;
   c. providing a conduit for channeling the release of said charge of air, said conduit having a closed state and an open state, said conduit being capable of releasing said charge of air therethrough, approximately instantaneously, as a single pneumatic pulse in proximity to the second bead of the tire, near one end thereof;
   d. providing a barrel and a hose, said hose secured in cooperative engagement between the conduit and the barrel;
   e. providing a positioning member coupled to the device and adapted to position the barrel in cooperative engagement with the second bead of the tire and the rim to direct the pressurized air between the second bead of the tire and the rim; and
   f. establishing the open state of said conduit instantaneously wherein said air injected into the tire as a result of the impact of said pulse seats the second bead of the tire and rim assembly.

46. The method of claim 45 in which said establishing the open state of said conduit instantaneously step includes establishing the open state by foot actuation.

47. The device of claim 45 wherein the positioning member is rotatably coupled to the bracket to selectively store the hose and barrel or to position the barrel in cooperative engagement with the second bead of the tire and the rim to direct the pressurized air between the second bead of the tire and the rim during seating.

48. The device of claim 46 wherein the positioning member is rotatably coupled to the bracket to selectively store the hose and barrel or to position the barrel in cooperative engagement with the second bead of the tire and the rim to direct the pressurized air between the second bead of the tire and the rim during seating.

49. The device of claim 45 wherein:
   a. the positioning member comprises a first positioning member end and a second positioning member end;
   b. the positioning member comprises retention members affixed thereto proximate the second positioning member end to cooperatively receive and retain the hose; and
   c. the positioning member is coupled to the bracket of the device by a coupling means located proximate the first positioning member end.

50. The device of claim 46 wherein:
   a. the positioning member comprises a first positioning member end and a second positioning member end;
   b. the positioning member comprises retention members affixed thereto proximate the second positioning member end to cooperatively receive and retain the hose; and
   c. the positioning member is coupled to the bracket of the device by a coupling means located proximate the first positioning member end.

51. The device of claim 47 wherein:
   a. the positioning member comprises a first positioning member end and a second positioning member end;
   b. the positioning member comprises retention members affixed thereto proximate the second positioning member end to cooperatively receive and retain the hose; and
   c. the positioning member is coupled to the bracket of the device by a coupling means located proximate the first positioning member end.

52. The device of claim 48 wherein:
   a. the positioning member comprises a first positioning member end and a second positioning member end;
   b. the positioning member comprises retention members affixed thereto proximate the second positioning member end to cooperatively receive and retain the hose; and c. the positioning member is coupled to the bracket of the device by a coupling means located proximate the first positioning member end.

53. A method for seating the first bead and second bead of a tubeless tire and rim assembly, including the steps of:
   a. accumulating at elevated pressure a charge of air;
   b. supporting the tire and rim assembly in a substantially upright position such that the weight of the rim automatically substantially seats a first bead of the tire and the rim;
   c. providing a conduit for channeling the release of said charge of air, said conduit having a closed state and an open state, said conduit being capable of releasing said charge of air therethrough, approximately instantaneously, as a single pneumatic pulse in proximity to the second bead of the tire, near one end thereof;
   d. providing a barrel and a hose, said hose secured in cooperative engagement between the conduit and the barrel;
   e. providing a positioning member coupled to the device and adapted to position the barrel in cooperative engagement with the second bead of the tire and the rim to direct the pressurized air between the second bead of the tire and the rim; and
   f. establishing the open state of said conduit instantaneously wherein said air injected into the tire as a result of the impact of said pulse seats the second bead of the tire and the rim.

54. The method of claim 53 in which said establishing the open state of said conduit instantaneously step includes establishing the open state by foot actuation.

55. The device of claim 53 wherein the positioning member is rotatably coupled to the bracket to selectively store the hose and barrel or to position the barrel in cooperative engagement with the second bead of the tire and the rim to direct the pressurized air between the second bead of the tire and the rim during seating.

56. The device of claim 54 wherein the positioning member is rotatably coupled to the bracket to selectively store the hose and barrel or to position the barrel in cooperative engagement with the second bead of the tire and the rim to direct the pressurized air between the second bead of the tire and the rim during seating.

57. The device of claim 53 wherein:
   a. the positioning member comprises a first positioning member end and a second positioning member end;
   b. the positioning member comprises retention members affixed thereto proximate the second positioning member end to cooperatively receive and retain the hose; and
   c. the positioning member is coupled to the bracket of the device by a coupling means located proximate the first positioning member end.

58. The device of claim 54 wherein:
   a. the positioning member comprises a first positioning member end and a second positioning member end;
   b. the positioning member comprises retention members affixed thereto proximate the second positioning member end to cooperatively receive and retain the hose; and
   c. the positioning member is coupled to the bracket of the device by a coupling means located proximate the first positioning member end.

59. The device of claim 55 wherein:
   a. the positioning member comprises a first positioning member end and a second positioning member end;
   b. the positioning member comprises retention members affixed thereto proximate the second positioning member end to cooperatively receive and retain the hose; and
   c. the positioning member is coupled to the bracket of the device by a coupling means located proximate the first positioning member end.

60. The device of claim 56 wherein:
   a. the positioning member comprises a first positioning member end and a second positioning member end;
   b. the positioning member comprises retention members affixed thereto proximate the second positioning member end to cooperatively receive and retain the hose; and
   c. the positioning member is coupled to the bracket of the device by a coupling means located proximate the first positioning member end.

61. A method for seating the first bead and second bead of a tubeless tire and rim assembly, including the steps of:
   a. accumulating at elevated pressure a charge of air an air tank containing pressurized air, the air tank being mounted substantially within a bracket;
   b. supporting the tire and rim assembly in a substantially upright position against the bracket such that the weight of the tire automatically substantially seats the first bead of the tire and the rim;
   c. providing a conduit for channeling the release of said charge of air, said conduit having a closed state and an open state, said conduit being capable of releasing said charge of air therethrough, approximately instantaneously, as a single pneumatic pulse in proximity to the second bead of the tire, near one end thereof;
   d. providing a barrel and a hose, said hose secured in cooperative engagement between the conduit and the barrel;
   e. providing a positioning member coupled to the device and adapted to position the barrel in cooperative engagement with the second bead of the tire and the rim to direct the pressurized air between the second bead of the tire and the rim; and
   f. establishing the open state of said conduit instantaneously wherein said air injected into the tire as a result of the impact of said pulse seats the second bead of the tire and the rim.

62. The method of claim 61 in which said establishing the open state of said conduit instantaneously step includes establishing the open state by foot actuation.

63. The device of claim 61 wherein the positioning member is rotatably coupled to the bracket to selectively store the hose and barrel or to position the barrel in cooperative engagement with the second bead of the tire and the rim to direct the pressurized air between the second bead of the tire and the rim during seating.

64. The device of claim 62 wherein the positioning member is rotatably coupled to the bracket to selectively store the hose and barrel or to position the barrel in cooperative engagement with the second bead of the tire and the rim to direct the pressurized air between the second bead of the tire and the rim during seating.

65. The device of claim 61 wherein:
   a. the positioning member comprises a first positioning member end and a second positioning member end;
   b. the positioning member comprises retention members affixed thereto proximate the second positioning member end to cooperatively receive and retain the hose; and c. the positioning member is coupled to the bracket of the device by a coupling means located proximate the first positioning member end.

66. The device of claim 62 wherein:
a. the positioning member comprises a first positioning member end and a second positioning member end;
b. the positioning member comprises retention members affixed thereto proximate the second positioning member end to cooperatively receive and retain the hose; and
c. the positioning member is coupled to the bracket of the device by a coupling means located proximate the first positioning member end.

67. The device of claim 63 wherein:
a. the positioning member comprises a first positioning member end and a second positioning member end;
b. the positioning member comprises retention members affixed thereto proximate the second positioning member end to cooperatively receive and retain the hose; and
c. the positioning member is coupled to the bracket of the device by a coupling means located proximate the first positioning member end.

68. The device of claim 64 wherein:
a. the positioning member comprises a first positioning member end and a second positioning member end;
b. the positioning member comprises retention members affixed thereto proximate the second positioning member end to cooperatively receive and retain the hose; and
c. the positioning member is coupled to the bracket of the device by a coupling means located proximate the first positioning member end.

69. A method for seating the first bead and second bead of a tubeless tire and rim assembly, including the steps of:
a. accumulating at elevated pressure a charge of air an air tank containing pressurized air, the air tank being mounted substantially within a bracket;
b. supporting the tire and rim assembly in a substantially upright position against the bracket such that the weight of the tire automatically substantially seats the first bead of the tire and the rim;
c. providing a conduit for channeling the release of said charge of air, said conduit having a closed state and an open state, said conduit being capable of releasing said charge of air therethrough, approximately instantaneously, as a single pneumatic pulse in proximity to the second bead of the tire, near one end thereof;
d. providing a barrel and a hose, said hose secured in cooperative engagement between the conduit and the barrel;
e. providing a positioning member coupled to the device and adapted to position the barrel in cooperative engagement with the second bead of the tire and the rim to direct the pressurized air between the second bead of the tire and the rim; and
f. establishing the open state of said conduit instantaneously wherein said air injected into the tire as a result of the impact of said pulse seats the second bead of the tire and the rim.

70. The method of claim 69 in which said establishing the open state of said conduit instantaneously step includes establishing the open state by foot actuation.

71. The device of claim 69 wherein the positioning member is rotatably coupled to the bracket to selectively store the hose and barrel or to position the barrel in cooperative engagement with the second bead of the tire and the rim to direct the pressurized air between the second bead of the tire and the rim during seating.

72. The device of claim 70 wherein the positioning member is rotatably coupled to the bracket to selectively store the hose and barrel or to position the barrel in cooperative engagement with the second bead of the tire and the rim to direct the pressurized air between the second bead of the tire and the rim during seating.

73. The device of claim 69 wherein:
a. the positioning member comprises a first positioning member end and a second positioning member end;
b. the positioning member comprises retention members affixed thereto proximate the second positioning member end to cooperatively receive and retain the hose; and
c. the positioning member is coupled to the bracket of the device by a coupling means located proximate the first positioning member end.

74. The device of claim 70 wherein:
a. the positioning member comprises a first positioning member end and a second positioning member end;
b. the positioning member comprises retention members affixed thereto proximate the second positioning member end to cooperatively receive and retain the hose; and
c. the positioning member is coupled to the bracket of the device by a coupling means located proximate the first positioning member end.

75. The device of claim 71 wherein:
a. the positioning member comprises a first positioning member end and a second positioning member end;
b. the positioning member comprises retention members affixed thereto proximate the second positioning member end to cooperatively receive and retain the hose; and
c. the positioning member is coupled to the bracket of the device by a coupling means located proximate the first positioning member end.

76. The device of claim 72 wherein:
a. the positioning member comprises a first positioning member end and a second positioning member end;
b. the positioning member comprises retention members affixed thereto proximate the second positioning member end to cooperatively receive and retain the hose; and
c. the positioning member is coupled to the bracket of the device by a coupling means located proximate the first positioning member end.

* * * * *